United States Patent [19]

Cohen et al.

[11] Patent Number: 5,644,752
[45] Date of Patent: Jul. 1, 1997

[54] COMBINED STORE QUEUE FOR A MASTER-SLAVE CACHE SYSTEM

[75] Inventors: Earl T. Cohen, Fremont; Russell W. Tilleman, Palo Alto; Jay C. Pattin, Redwood City, all of Calif.

[73] Assignee: Exponential Technology, Inc., San Jose, Calif.

[21] Appl. No.: 350,815

[22] Filed: Dec. 7, 1994

Related U.S. Application Data

[63] Continuation-in-part of Ser. No. 267,658, Jun. 29, 1994, Pat. No. 5,551,001.

[51] Int. Cl.$^6$ .................................................. G06F 12/08
[52] U.S. Cl. ................ 395/449; 395/471; 395/450; 395/457; 395/448; 395/469; 395/473
[58] Field of Search ...................... 395/448, 452, 395/463, 464, 449, 450, 455, 457, 458, 460, 462, 467, 469, 471, 473; 364/DIG. 1

[56] References Cited

U.S. PATENT DOCUMENTS

| | | | |
|---|---|---|---|
| 5,023,776 | 6/1991 | Gregor | 395/449 |
| 5,113,515 | 5/1992 | Fite et al. | 395/452 |
| 5,136,700 | 8/1992 | Thacker | 395/449 |
| 5,146,578 | 9/1992 | Zangenepour | 395/464 |
| 5,224,217 | 6/1993 | Zangenepour | 395/463 |
| 5,261,066 | 11/1993 | Jouppi et al. | 395/449 |
| 5,265,229 | 11/1993 | Sareen | 395/280 |
| 5,276,848 | 1/1994 | Gallagher et al. | 395/448 |

*Primary Examiner*—Tod R. Swann
*Assistant Examiner*—J. Peikari
*Attorney, Agent, or Firm*—Stuart T. Auvinen

[57] ABSTRACT

A master-slave cache system has a large master cache and smaller slave caches, including a slave data cache for supplying operands to an execution pipeline of a processor. The master cache performs all cache coherency operations, freeing the slaves to supply the processor's pipelines at their maximum bandwidth. A store queue is shared between the master cache and the slave data cache. Store data from the processor's execute pipeline is written from the store queue directly into both the master cache and the slave data cache, eliminating the need for the slave data cache to write data back to the master cache. Additionally, fill data from the master cache to the slave data cache is first written to the store queue. This fill data is available for use while in the store queue because the store queue acts as an extension to the slave data cache. Cache operations, diagnostic stores and TLB entries are also loaded into the store queue. A new store or line fill can be merged into an existing store queue entry. Each entry has valid bits for the master cache, the slave data cache, and the slave's tag. Separate byte enables are provided for the master and slave caches, but a single physical address field in each store queue entry is used.

19 Claims, 4 Drawing Sheets

COMBINED STORE QUEUE FOR A MASTER-SLAVE CACHE SYSTEM

BACKGROUND OF THE INVENTION— RELATED APPLICATIONS

This application is a Continuation-in-Part of application for a "Master-Slave Cache System", filed Jun. 29, 1994, U.S. Ser. No. 08/267,658, now U.S. Pat. No. 5,551,001, having a common inventor and assigned to the same assignee as the present application.

BACKGROUND OF THE INVENTION—FIELD OF THE INVENTION

This invention relates to cache memories, and more particularly to a store queue for writing to cache memories.

BACKGROUND OF THE INVENTION— DESCRIPTION OF THE RELATED ART

A master-slave caching scheme is described in the co-pending parent application for a "Master-Slave Cache System", filed Jun. 29, 1994, U.S. Ser. No. 08/267,658, now Pat. No. 5,551,001, hereby incorporated by reference. The master-slave cache system includes a larger master cache that provides a low miss rate, and supports all prefetching and cache coherency operations. The master cache controls two smaller slave caches, a slave-instruction cache and a slave-data cache. The master cache includes valid bits for the slave caches, and will instruct the slave caches to invalidate a line when a coherency hit is detected by the master cache.

The instruction and data slave caches are kept small and simple so that they can match the bandwidth required by their respective pipelines. The slave caches are tightly coupled to the master cache which results in a low miss penalty for a slave cache miss that hits in the master cache. Thus the slave caches provide the high bandwidth required by the pipelines, while the master cache provides a low miss rate with a large size and associative organization.

The slave data cache is read during loads from the execute pipeline. If the slave data cache is busy, the execute pipeline must stall. If the slave data cache is often busy writing in data, performance will be degraded. Data must be written into the slave data cache for stores from the execute pipeline, and for cache-line fills from the master cache to the slave data cache. Buffering these writes when a load occurs can improve performance by delaying these writes until a free cycle.

It is also desired to buffer execution-pipeline stores to the master cache, to allow the execute pipeline to continue without stalling when the master cache is busy. Cache operations, such as invalidates and cache coherency operations should also be buffered to the master cache. When buffering cache operations it is important to keep them well-ordered with respect to normal stores.

Thus a goal of the store queue is to minimize execute pipeline stalls caused by writing to the slave data cache at the same time that the execute pipeline wishes to read the slave data cache. Another goal is to minimize store stalls due to a full store queue while still minimizing the amount of store queue memory and control logic required.

Transfer of write or store data from the execute pipeline to the slave data cache and the master cache must be carefully coordinated so that any matching lines in either the master or slave caches are updated with the store data. Fills from the master cache to the slave data cache must also be buffered to prevent interference with the execute pipeline. Multiple store queues and fill buffers may be used. However, a more economical approach is desired.

What is desired is a single store queue to operate with the master-slave cache system. The store queue should be able to accept stores from the execute pipeline and route store data to the slave data cache and to the master cache. Additionally, it is desired to have fill data from the master cache to the slave data cache also be routed through the store queue, simplifying the interconnection to the slave data cache by having all writes to the slave data cache go through the store queue. It is also desired to have a single store queue accept updates to the translation-lookaside buffer (TLB) as well as data for the master and slave data caches. It is additionally desired to have the store queue accept all cache operations, such as cache coherency and cache diagnostic operations from the processor, allowing their order of execution to be preserved.

SUMMARY OF THE INVENTION

A single store-queue is provided to accept store data from the processor's execute pipeline for writing into either the slave data cache or the master cache, or both. The store queue is used as an extension of the slave data cache. Fill data from the master cache to the slave data cache is therefore written to the store queue and is immediately useable, even before being written into the slave data cache.

A master-slave cache system transfers data between a main memory and a central processing unit (CPU). The CPU has an execution pipeline that executes at a first rate, while the main memory stores a plurality of operands. The system comprises a master cache for storing operands, that is coupled to the main memory. This master cache stores a first subset of the plurality of operands stored in the main memory and a second subset of operands. The second subset is a subset of the first subset.

A slave data cache is coupled to the execution pipeline, and stores the second subset of operands. It is capable of transferring operands to the execution pipeline at the first rate. A store queue is coupled to receive stores from the execution pipeline. The store queue temporarily stores operands for writes to the master cache and the slave data cache.

In further aspects of the invention, the store queue includes a means for receiving line fills from the master cache, a means for storing the line fills in the store queue, and a means for writing the line fills to the slave data cache. The store queue stores operands from the execute pipeline for writing to the master cache and the slave data cache, and the store queue stores line fills from the master cache to the slave data cache. In other aspects the store queue receives a line fill from the master cache in response to a miss in the slave data cache.

The store queue comprises a plurality of entries, each entry in the plurality of the entries comprising:

a data field for storing store data from the execute pipeline or line fill data from the master cache;

a physical address field for indicating a portion of a physical address of data in the data field; and a destination valid means for indicating a destination of the data in the data field.

In still further aspects of the invention the destination valid means has a master valid indicating means for indicating if the entry contains valid data for writing to the master cache, and a slave valid indicating means for indicating if the entry contains valid data for writing to the slave data cache. The destination valid means may also have a slave tag valid indicating means for indicating if the entry contains a valid physical address for writing to a tag in the slave data cache.

In other aspects of the invention each entry has a cache operation indicating means for indicating that the entry is a cache operation rather than a store or line fill. The data field includes an encoding of a type of cache operation when the cache operation indicating means indicates that the entry is a cache operation.

When the cache operation indicating means indicates that the entry is a cache operation, the master valid indicating means indicates that the entry contains valid data for writing to the master cache and the slave valid indicating means indicates that the entry is not for writing to the slave data cache. Thus cache operations are only sent to the master cache but not to the slave data cache.

The shared store queue not only saves complexity by having one storage buffer for both the master and slave caches, but it can be used to buffer line fills to the slave data cache from the master cache, further saving buffering and control logic. Cache operations for the master cache can also be written into the shared store queue by the execution pipeline, and the master cache can cause the slave data cache to invalidate a line by setting the destination valid means in the store queue in an appropriate manner.

DETAILED DESCRIPTION

The present invention relates to an improvement in cache memories. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

A master-slave cache system was disclosed in the related application entitled "Master-Slave Cache System", filed Jun. 29, 1994, U.S. Ser. No. 08/267,658, now U.S. Pat. No. 5,551,001, hereby incorporated by reference. That application is assigned to the same assignee as the present application. The master-slave cache system includes a larger master cache that provides a low miss rate, and supports all prefetching and cache coherency operations. The master cache controls two smaller slave caches, a slave-instruction cache and a slave-dam cache. The master cache includes valid bits for the slave caches, and will instruct the slave caches to invalidate a line when a coherency hit is detected by the master cache.

NOMENCLATURE USED

In the preferred embodiment, the caches are organized as cache lines each consisting of four sub-lines. Each sub-line is a 64-bit (eight-byte) double word. The sub-line is the smallest quantity that can be stored in the caches. Updating a single byte requires that the entire 8-byte sub-line be brought into the cache before the single byte is updated. The basic unit of dam transfer to and from the slave caches is the sub-line, also known as a sub-block.

The preferred embodiment will be described for a system having a 32-bit byte-address known as the physical address because it is the actual address of the datum in memory. Only 29 bits of the physical address are needed to identify a particular eight-byte double-word stored in the caches.

The 29-bit physical address of a double-word is divided up into a tag and an index. The tag is the upper or most-significant portion of the address, while the index is the lower portion. The index is used to identify a cache line and a sub-line. The preferred embodiment has a 21-bit tag and a 8-bit sub-line index. The upper 6 bits of the 8-bit sub-line index is known as the line index. The line index specifies one line in a cache with 64 lines. The remaining 2 bits of the index specify one of the four sub-lines in a line. The sub-line index thus includes the 6-bit line index and the 2 bits for specifying the sub-line.

Figure 1:
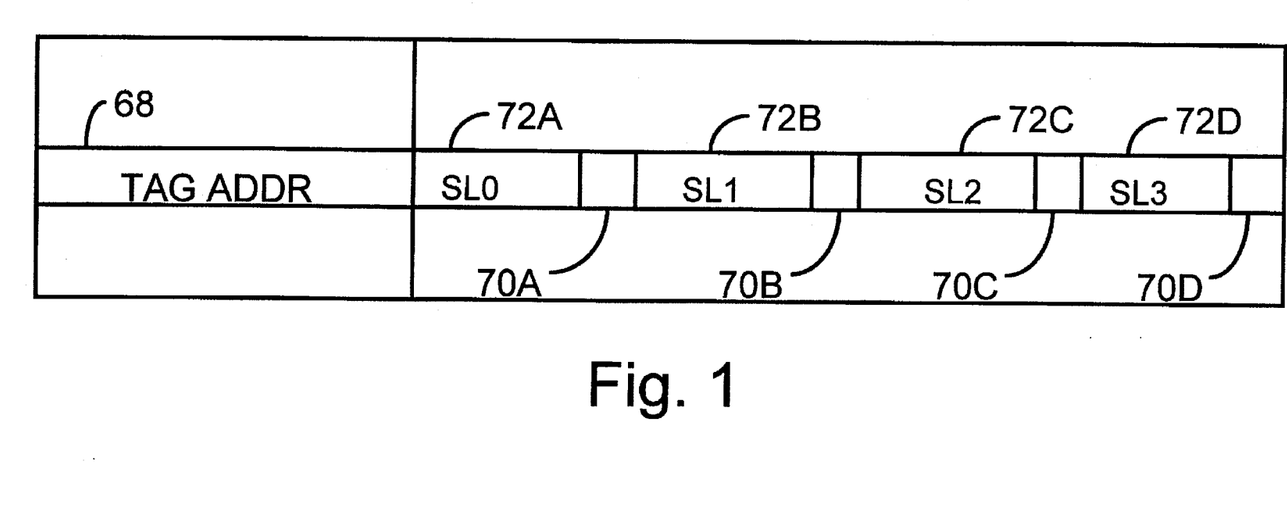
FIG. 1 is a diagram of the slave data cache.

FIG. 1 is a diagram of the slave data cache 28. Each line in the slave data cache has four sub-lines 72A, 72B, 72C, 72D. Each sub-line is a 64-bit double-word of data. Sub-line validity is provided by sub-line valid bits 70A, 70B, 70C, 70D, one valid bit for each of the four sub-lines. The sub-line or sub-block size is 64 bits, so 64 bits are supplied to the execute pipeline on a load, even though the execute pipeline may require less than 64 bits. The execute pipeline may select a subset of the 64-bit double-word. Other embodiments may use different bits and widths for the pipeline and sub-line and the tag and index portions of the address, as these vary with the size and arrangement of the caches.

Wrapable is a term synonymous with bypass. It means that data from an entry in the store queue may be bypassed to the execute pipeline to supply a load, rather than using the data in the slave data cache.

STORE QUEUE IN A PROCESSOR

In a highly-pipelined processor, a store queue is often necessary for performance. The store queue holds data operands from the execution pipeline that are to be written out to the cache or memory. The store queue is a useful structure for buffering stores to the cache and main memory. Often the slave data cache will be busy processing a read request from the pipeline, preventing the store from being immediately written to the slave data cache. The store queue can hold the store data until the slave data cache has a free cycle. The store queue may be several words deep, allowing it to buffer several stores simultaneously.

Since the master cache is tightly coupled to the slave data cache, the store queue may be shared between the master cache and the slave data cache. Because the slave data cache is preferably write-through, lines do not have to be copied back to the master cache after a miss occurs and an old line is replaced. If the store data from the execution pipeline is written to both the slave data cache and the master cache via the store queue, the slave data cache does not need a separate mechanism for writing-through to the master cache. This helps to reduce complexity of the master-slave cache and saves space by sharing store queue storage.

Example of a Store Queue in a Microprocessor

Figure 2:
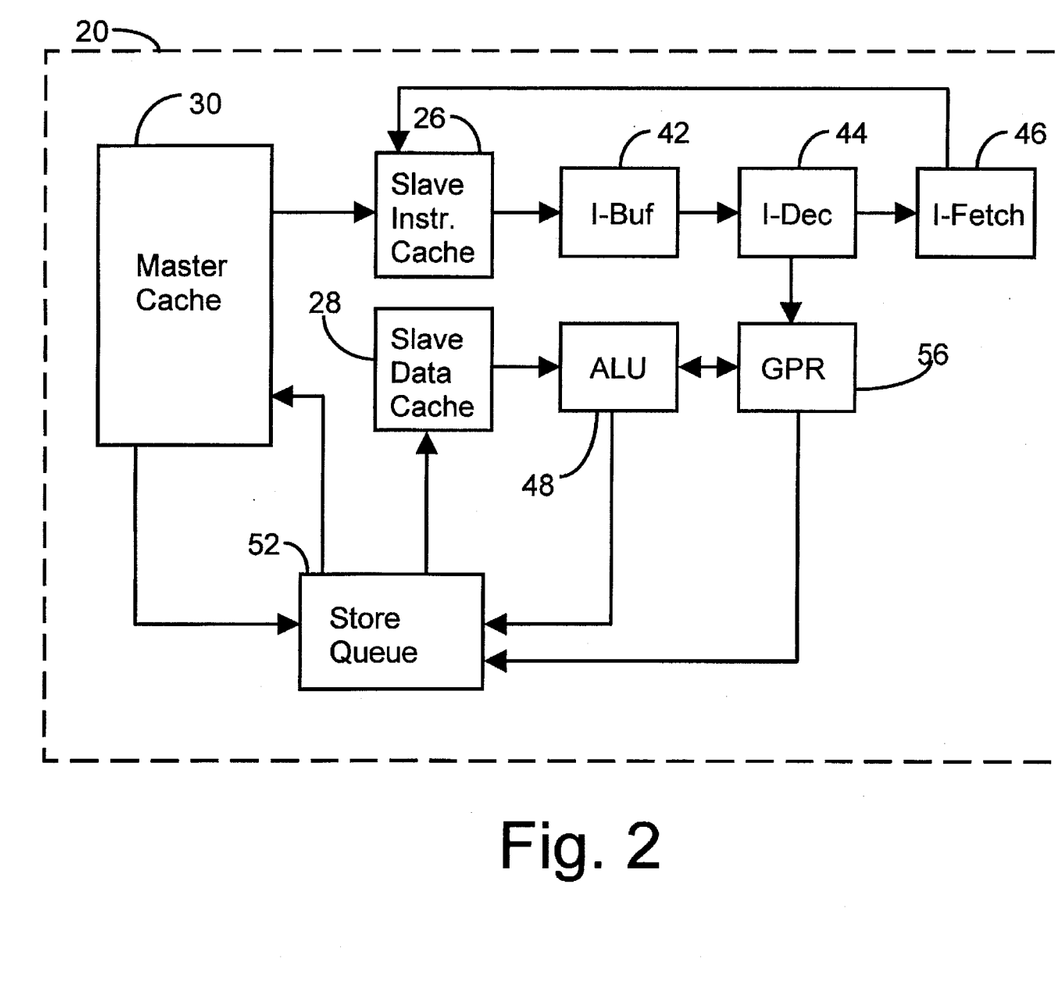
FIG. 2 shows a store queue within the microprocessor die.

FIG. 2 shows the store queue 52 within microprocessor die 20. The slave instruction cache 26 supplies instruction words to the instruction pipeline, which includes instruction buffer 42, instruction decoder 44, and instruction fetcher 46. Instruction decoder 44 is the last stage of the instruction pipeline, and feeds decoded instructions to the execute pipeline. The execution pipeline includes general-purpose registers 56, which contain temporary storage areas visible to and available for use by programs. The general-purpose registers 56 feed operands to an arithmetic-logic unit (ALU) 48, which performs an operation on the data operands. Data operands may be selected from the general-purpose registers 56, or from memory. Memory operands are supplied by slave data cache 28. ALU 48 may write the result of the operation back into the general-purpose registers 56, or the result may be written or stored to memory. The operation that the ALU executes may simply be to move data from the general-purpose registers 56 and store that data to the memory. The store data is transferred to the store queue 52 from either the ALU 48 or directly from the general-purpose registers 56. Data in the store queue 52 is then written to the slave data cache 28, if the store data corresponds to a line in the slave data cache 28, and to the master cache 30.

Once data is placed in the store queue 52, the actual write operations to the master cache 30 and the slave data cache 28 could occur at slightly different times, when a free cycle occurs for the master cache 30 and for the slave data cache 28. Master cache 30 could have many free cycles, allowing several stores to be written to the master cache 30 before even the first store is written to the slave data cache 28, or the reverse may be true.

A policy of allocate on write for the slave data cache 28 would require added complexity. Therefore stores that miss in the slave data cache 28 preferably do not cause a new line to be allocated to the slave data cache 28. Rather, the store data are simply not written to the slave data cache 28 but are written only to the master cache 30. Thus some of the stores in the store queue 52 will not be written to the slave data cache 28. However, all cacheable stores are written to the master cache 30.

STORE QUEUE CONTENTS

Figure 3:
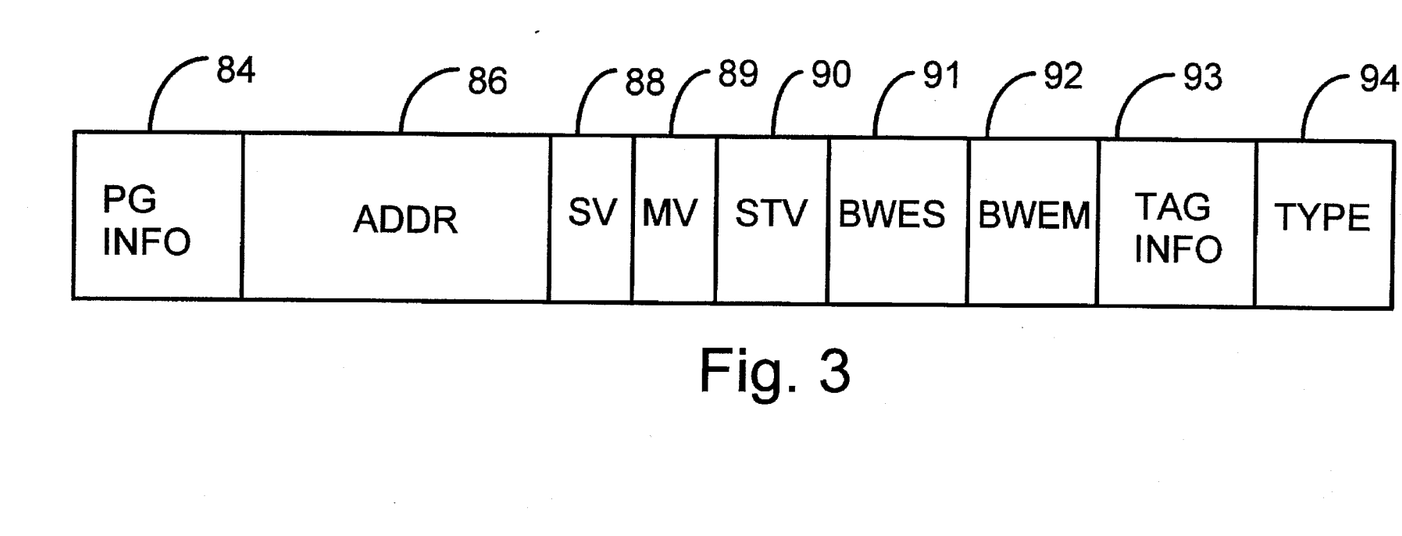
FIG. 3 is a simplified diagram of a store queue tag.

FIG. 3 is a simplified diagram of a store queue entry. The store queue 52 also contains fields for the store data (not shown) in each store queue entry. These store queue entries are similar to cache lines and tags. A store queue entry includes an address field 86 for the physical address of the store. Page information field 84 specifies properties about the corresponding physical page in memory, such as write-through, guarded, cacheable, or coherent. The store queue 52 also includes master valid bit 89, to indicate that the store data needs to be been written to the master cache 30, and slave valid bit 88, to indicate that the data needs to be written to the slave data cache 28. These valid bits 89, 88 are necessary since the writing to the master and slave cache may occur in any order. A slave-tag-valid bit 90 indicates that the store data is a line fill or invalidate from the master cache, and that the address tag in the slave data cache 28 must also be updated when the data is written. Two byte-enable fields, 91, 92 specify which bytes are valid for the slave and master, allowing merges of bytes for multiple writes to the same double-word. Tag information field 93 may contain parity, sub-line validity, or other information. Type field 94 specifies if the store queue entry is a normal cacheable write from the execution pipeline, or if it contains a cache operation such as an invalidate request or zeroing operation from the CPU, or if it is some other kind of write (non-cacheable, diagnostic).

DETAIL OF A STORE QUEUE ENTRY

Figure 4:
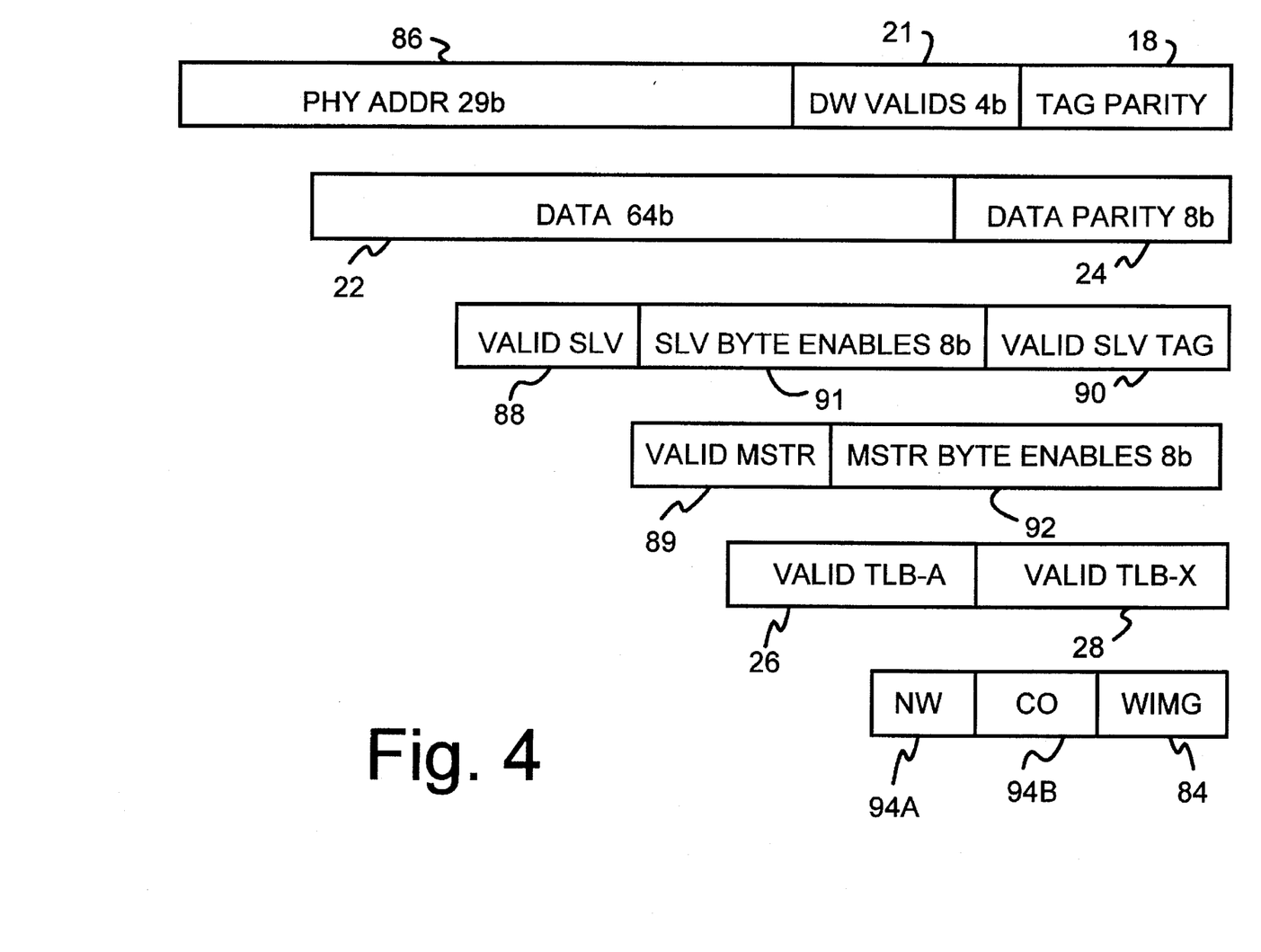
FIG. 4 shows in detail the different fields in a store queue entry.

FIG. 4 shows in detail the different fields in a store queue entry. The store queue may contain anywhere from one to dozens of such entries, depending on the needs of the pipelines and the hardware budget. A physical address field 86 contains the 29 most-significant bits of the physical address of the data in the store queue entry. A tag parity field 18 contains one or more parity bits for the physical address field 86 and the sub-line valid bits 21.

Four sub-line valid bits 21 indicate which of the first, second, third, or fourth 64-bit sub-lines in a 256-bit cache line is valid in the slave cache. These sub-line valid bits will be written into the slave data cache when the tag is written. They contain validity information for not only the one sub-line of data in the store queue entry, but also validity information for any other sub-lines of the same cache line that are currently valid in the slave data cache itself. However, if the slave tag valid bit 90 is not set, then none of the sub-line valid bits are used to indicate validity.

The actual store or fill data is contained in data field 22, which can hold one 64-bit sub-line. A data parity field 24 holds parity bits for data field 22.

Several valid bits indicate the destination for the data in the entry. These include slave valid bit 88, master valid bit 89, and slave-tag valid bit 90. The store queue entry might be normal store data from the execute pipeline, destined for the master cache. This store data is also written to the slave data cache if a line matching its address field is found in the slave data cache or the store queue. In this case, slave valid bit 88 and master valid bit 89 are both set. Additionally, slave byte enables 91 and master byte enables 92 are set to indicate which of the eight bytes in the 64-bit sub-line are valid. The execute pipeline can perform writes of various sizes up to eight bytes.

When a new cache line is written to the store queue from the master cache, the master valid bit 89 is not set, but the slave valid bit 88 is set. In addition, the tag field in the slave data cache must be updated to reflect the address of the new cache line. The slave tag valid bit 90 is set to indicate that the slave's tag should also be written when the data is written into the slave data cache.

If the store queue entry is being used for a TLB entry instead of fill or store data, then TLB valid bit 26 or 28 is set. Additional valid bits could be used for other storage structures on the microprocessor die that are written through the store queue.

Attributes are stored in type fields 94A, 94B. Field 94A indicates if the store queue entry in non-wrapable (NW), meaning that data from this entry may not be bypassed to the execute pipeline to supply a load. Instead, the load must wait until the store queue data is actually written into either the master cache or slave data cache. This NW bit indicates a special store queue entry, such as a cache or diagnostic operation, or a non-cacheable store. Field 94B indicates a cache operation (CO) such as an invalidate. Page information field 84 contains attribute information about the data in the store queue entry from the TLB. This information includes the following four bits:

| W | Write-through to main memory |
| I | Cache Inhibit (data is non-cacheable) |
| M | MESI coherence required (broadcast write) |
| G | Guarded Storage Area. |

Certain areas of memory can be designated as guarded storage areas. This is useful for memory-mapped input-output devices. Prefetching should not occur to guarded memory areas. Other areas of memory can be designated as coherent areas. This is useful for setting up communication mailboxes or shared data between processors. Any writes to a coherent memory area are broadcast off the microprocessor die to any external processors. The MESI coherence protocol specifies how memory areas may be shared coherently by several processors. All handling of MESI coherence protocol operations is done through the master cache. This frees the slave caches to perform any read or write operation without concern for coherency.

CODING OF VALID AND ATTRIBUTE BITS

The type of entry in the store queue is determined from the setting of the valid and attribute bits. When all valid bits are off, the entry is empty and can be used for a new store or fill. An entry is still empty if the sub-line valid bits 21 are set, but the other valid bits are off. The slave valid bit is set when the data is to be written to the slave data cache, as for stores, fills, or diagnostic writes to the data portion of the slave data cache. The slave tag-valid bit is set for diagnostic writes to the slave data cache's tags, or for fills from the master cache. The master valid bit is set for diagnostic/cache operations to the master cache, and normal stores. The master valid bit is also set for non-cacheable stores to indicate that the store goes directly to the bus interface unit (BIU). Diagnostic or cache operations and non-cacheable stores have the non-wrapable bit (NW) set, while normal cache stores and fills have the NW bit cleared. Table 1 summarizes these store-queue entry types.

queue may be dynamically allocated between fill data and store data, resulting in a more efficient use of processor resources.

The store queue 52 is the only path for store data from the execution pipeline to be written out to the master cache 30 and the slave data cache 28. In addition, the store queue is the primary path to write data from the master cache 30 to the slave data cache 28. All writes to the slave data cache are buffered through the store queue, except when the store queue is full, when a fill is written directly to the slave data cache. This eliminates the need for a second write port into the slave data cache 28. Buffering all writes through a single store queue also simplifies control and timing.

Normal stores set the master valid bit. The slave valid bit is also set if the store hits in the slave data cache. Normal stores do not set the slave tag valid bit. When the master stores the data, the master valid bit is turned off while the slave valid bit is left on. Likewise, the slave valid bit is turned off once the slave has written the store data, possibly leaving the master valid bit on. Only when both the master and slave have written the store data can the entry be considered empty and re-used.

Data is stored on a sub-line basis, as each entry in the store queue can hold up to one sub-line (8-byte double-word) of data. Any subset of the 8 bytes in the sub-line may be valid for either the master or slave cache. Two sets of byte enables are provided—one set for the slave data cache, and one set

TABLE 1

| | | | | | | | Store Queue Entry Types |
|---|---|---|---|---|---|---|---|
| Slave Valid | Slave Tag Valid | Master Valid | TLB Valid | NW | CO | I | Type of Entry |
| 0 | 0 | 0 | 0 | x | x | x | Empty |
| 0 | 0 | 0 | 1 | 1 | x | x | Diagnostic Write to TLB |
| 0 | 1 | 0 | 0 | 1 | x | x | Diagnostic Write to Slave Tags |
| 1 | 0 | 0 | 0 | 1 | x | x | Diagnostic Write to Slave Data |
| 0 | 0 | 1 | 0 | 1 | 0 | 0 | Diagnostic Write to Master |
| 0 | 0 | 1 | 0 | 1 | 0 | 1 | Non-Cacheable Store |
| 0 | 0 | 1 | 0 | 1 | 1 | x | Cache Operation |
| 0 | 0 | 1 | 0 | 0 | 0 | 0 | Store to Master |
| 1 | 0 | 1 | 0 | 0 | 0 | 0 | Store to Master & Slave |
| 1 | 1 | 0 | 0 | 0 | 0 | 0 | Fill to Slave |
| 1 | 0 | 0 | 0 | 0 | 0 | 0 | Store to Slave (Master Consumed) |
| 1 | 1 | 1 | 0 | 0 | 0 | 0 | Store Merged with a Fill |

The TLB valid bit indicates when the operation is a diagnostic or normal write to the TLB. The slave's tag and data valid bits are both set for fills from the master cache. Some of the other store entries in Table 1 can also occur when a store is merged with another store or a fill.

OVERVIEW OF OPERATION

The store queue stores all data that will be written to the slave data cache. This includes stores from the execution pipeline, and cache-line fills from the master cache. The store queue also stores all data to be written to the master cache, except for data from external memory, which uses the buffers in the BIU. Thus the store queue is a shared store queue.

Instead of having a separate fill buffer for fill data from the master cache to the slave data cache, the store queue is used as the fill buffer. A large savings in hardware results because address compare and bypass logic in the store queue is shared with the fill buffer. The storage space in the store for the master cache. These two sets facilitate merges, as they can be separately updated.

Merges

A cacheable sub-line can ordinarily be present in only one entry in the store queue. Before a new cacheable sub-line is loaded into the store queue, a compare of its physical address looks for any other cacheable entries in the store queue having a matching physical address. When the compare reveals a match in the sub-line address, then a merge must be performed so that only a single store queue entry can ever correspond to any cacheable sub-line. Instead of writing the new sub-line into an empty entry, the new sub-line is merged into the existing entry with the matching sub-line address.

However, non-cacheable data does not participate in merges. Two separate non-cacheable entries may exist in the store queue; these two entries would be merged if they were cacheable.

Merges increase the efficiency and performance of the storage mechanism by combining two or more separate stores into a single store. Thus while the execute pipeline performs two or more stores, the master and slave caches each have to perform only one store.

Only One Slave Tag Valid Allowed for a Cache Line

Entries in the store queue contain one sub-line of data. The address field corresponds to one cache line—four sub-lines of data in the cache. Likewise, only one slave-tag valid bit can be set for a cache line.

The master cache will load four store-queue entries with the four sub-lines of data when a cache-line fill occurs. Although four entries are needed for the four sub-lines of data, the address tag for the cache line only needs to be written once. Thus only one of the four entries will be marked with a set slave-tag valid bit. The other three entries will have their slave-tag valid bits cleared.

Any operations that set the slave-tag valid bit must clear any other slave-tag valid bits in entries having matching cache-line addresses. Only one entry for a given cache-line address can have the slave-tag valid bit set.

Store Queue Acts as an Adjunct of Slave Data Cache

The data in the store queue is always considered to be more recent than the data in the slave data cache. The store queue is not a strict subset of the slave data cache, nor is it a side cache. The store queue acts as an adjunct to the slave data cache: the store queue is an additional storage structure that may contain data that is to be used rather than the older data in the cache.

The store queue does not increase the associativity of the slave data cache. Associativity would be increased if a line in the slave data cache had the same index but a different physical address as a sub-line in the store queue. If both were valid, then two cache lines would be stored for one cache-line index, rather than just one. To keep the associativity constant, the older line in the slave data cache must be marked as invalid or not used for satisfying a load request. This older line in the slave data cache will soon be overwritten by the sub-line in the store queue. It is effectively overwritten already by the entry in the store queue. The older line in the cache is physically marked invalid when the store queue entry is actually written in to the cache.

To prevent every store from the execute pipeline from interfering with the lines in the slave data cache, the slave-tag valid bits are not set when store-queue entries are loaded from the execute pipeline, if the store data does not hit in the slave data cache. Stores from the execute pipeline that miss in the slave data cache are just written to the master cache. The slave valid bit will not be set when the store data does not hit in the slave data cache. It must be set if the store does hit in the slave data cache.

Tag Wrapping

In tag wrapping, the tag from the store queue is used rather than the tag in the slave data cache. Tag wrapping occurs when the data in the store queue has the same cache line index as an older line in the slave data cache. If the store queue entry is marked as slave tag valid, then the physical address tag in the store queue must be used rather than the address tag in the slave data cache.

Tag wrapping thus wraps the newer tag from the store queue instead of the older tag in the slave data cache that will soon be overwritten. Tag wrapping supplies the newer address tag when a load (read) compares the tags for a match determination.

Loads Bypassed from Store Queue

A load from the execute pipeline will usually hit in the slave data cache, which will send the data operand back to the execute pipeline. The data operand may also be supplied from the store queue if the store queue entry matches the sub-line address and its slave valid bit is set and it is cacheable (its non-wrapable (NW) bit is cleared). When the store queue supplies data to the processor's pipeline it is referred to as wrapping the store queue data or as bypassing the slave data cache. This saves a clock cycle to write the data operand into the slave data cache that would otherwise be required before supplying the data operand. A partial address compare on just the lower-order address bits (the index portion) may be used instead of a full address compare if the load can be discarded if the address tags do not match (a cache miss).

EXAMPLES OF SIMPLE STORE-QUEUE OPERATIONS

The operations required when a new cacheable store from the execute pipeline is placed into an empty entry in the store queue are:

1. Data bytes and parity bits are written for the bytes being stored, while other bytes are not changed.
2. The master valid bit is set.
3. The WIMG attribute bits are set. These bits come from the TLB during the translation from a virtual to the physical address.
4. The physical address is loaded into the physical address field and the tag parity bits are also written.
5. The slave tag valid bit is cleared.
6. The master and slave byte enables are set according to which bytes are being stored by the processor.
7. The slave valid bit is set if the store hits in the slave data cache.
8. The NW and CO bits are cleared.

A merge is required when the physical address of a new cacheable store matches the cache-line address of an existing cacheable entry in the store queue. The sequence to merge the new store from the execute pipeline into the existing entry is:

1. Data bytes and parity bits are written for the bytes being stored, while other bytes are not changed.
2. The master valid bit is set.
3. The WIMG attribute bits are set. These bits come from the TLB during the translation from a virtual to the physical address.
4. The physical address is loaded into the physical address field and the tag parity bits are written.
5. The slave tag valid bit is not changed. It was set if it the existing entry was a fill, but clear if the existing entry was a store.
6. The master and slave byte enables corresponding to bytes being stored are set, and all others are not changed.
7. The slave valid bit is set if the new store hits in the slave data cache.
8. The NW and CO bits are cleared (should be clear already).

A cacheable line fill that is being loaded into an empty store queue entry will do the following:

1. Data bytes and parity bits are written for the 8 bytes being stored.
2. The slave valid bit and slave tag valid bits are set.
3. The WIMG attribute bits are not modified.
4. The physical address is loaded into the physical address field and the tag parity bits are written.
5. The master valid bit is not changed. It was clear for an empty entry.

6. All of the slave byte enables are set. The master byte enables are not changed, but are already clear for an empty entry.
7. The NW and CO bits are cleared.

A new cacheable store may be merged into this line-fill entry using the same procedure for the merge. The slave tag valid bit would have been set if the entry was a line fill, but cleared for an existing store.

A cacheable line fill that is being merged into an existing store queue entry will follow the sequence:

1. Data bytes and parity bits are written for the bytes being stored, if they are not already valid for the master. Other bytes that are already valid for the master are not changed. A bytes is valid for the master if the master valid bit is set and the corresponding byte enable is set.
2. The slave valid bit and slave tag valid bits are set.
3. The WIMG attribute bits are not modified.
4. The physical address is loaded into the physical address field and the tag parity bits are written.
5. The master valid bit is not changed. It was set if it the existing entry was a store, but clear if the existing entry was a fill.
6. All of the slave byte enables are set. The master byte enables are not changed.
7. Clear the NW and CO bits are cleared.

DETAILED RULES FOR STORE-QUEUE

The store queue operates under a set of detailed rules. These rules are complex, covering the many possible combinations for merges, fills, and stores. Cache diagnostic and coherency operations are also provided for in these rules.

Certain principles, as discussed above for simple operations, are the basis for these rules. Additionally, these rules are needed to keep the most-recently-written data from the execute pipeline valid while older data from the master cache is overwritten by newer data.

Priority on Merges

New data is merged in with existing data based on the following rules. Store data from the execute pipeline is always the most up-to-date data and overwrites any existing data in a store queue entry with a matching address. However, line fill data from the master cache to the slave data cache is always stale compared to data in the store queue if the master valid bit is set. For fills that merge in to store queue entries where the master valid bit is set, new fill data is discarded that is located in bytes that are already enabled by the master byte enables. If the master valid bit is not set in the existing line that will be merged to, then the fill data from the master cache is current and can safely overwrite the data in the store queue.

A line fill merging to a store entry will set all of the slave byte enables, but not change any of the master byte enables. A store merging into an entry used for a fill or a previous store will set particular byte enables in both the master byte enable and slave byte enable fields. The particular byte enables set will be the particular bytes written by the execute pipeline. An earlier store could have written only the first byte of the eight bytes in a sub-line, while a later store only writes the last byte of the sub-line. After these two stores are merged together, the first and the last byte enables would be the only byte enables set. As store data is written to the slave data cache, all the slave byte enables will not be cleared until the entry is emptied out and re-used.

However, as the master cache consumes a store, the master byte enables are cleared. This prevents the same data from being written multiple times to the master cache. The same data will be re-written to the slave data cache on subsequent writes for merges, but this will not reduce performance as up to eight bytes may be written in a single clock cycle. The byte enables are therefore cumulative for the slave data cache but not for the master cache. The slave and master bytes enables are kept current as data is written to a store queue entry.

Data in the store queue may be written to the slave data cache in any order since tag wrapping effectively writes the new data into the combined cache/store queue as soon as a new entry is loaded into the store queue. However, the order entries were written into the store queue must be the same order these entries are written back to the master cache since the master cache does not wrap tags from the store queue. Thus strict ordering of writes to the master cache is necessary, but not for the slave data cache.

CONNECTIONS TO STORE QUEUE

Figure 5:
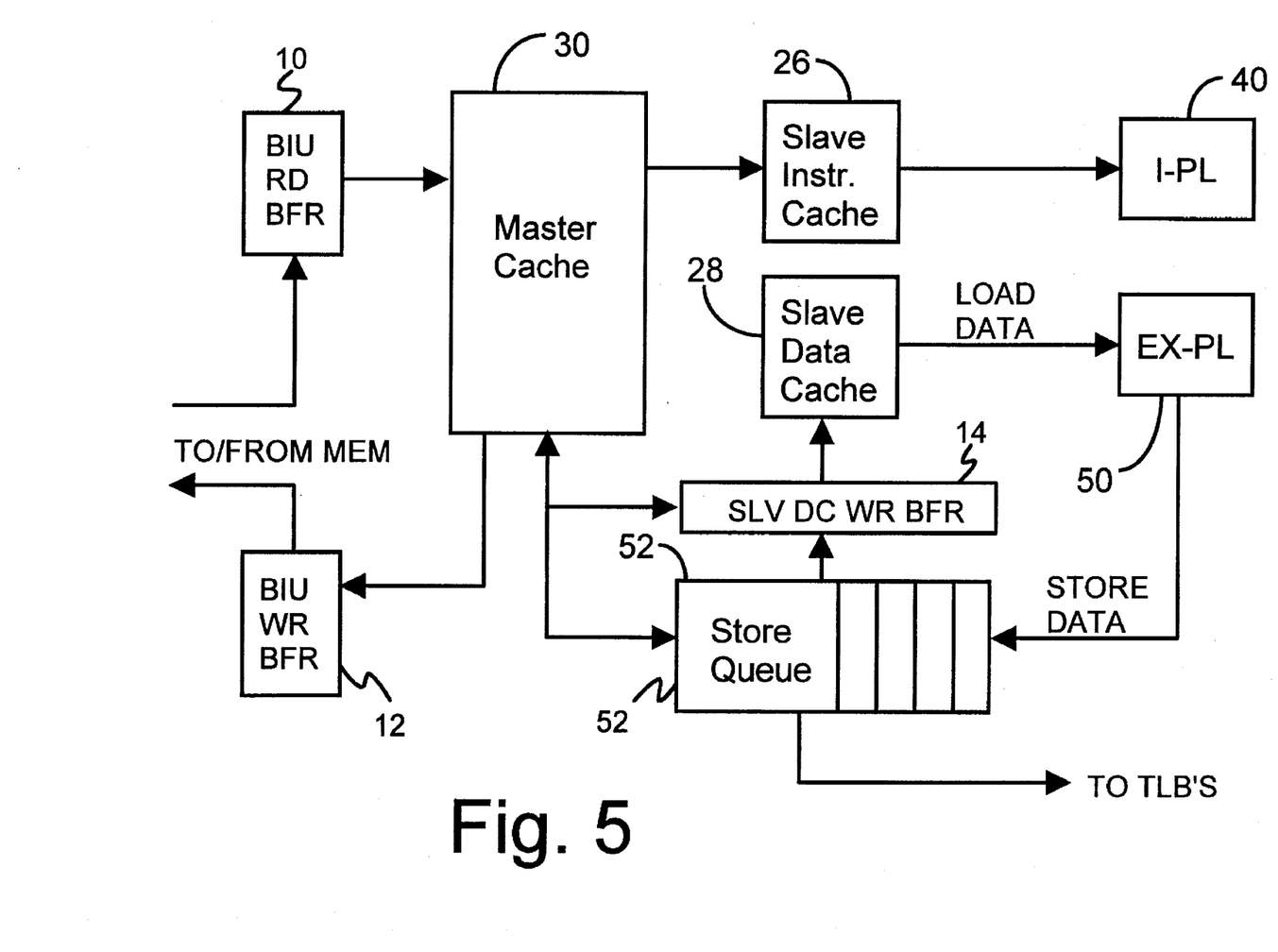
FIG. 5 is a detailed diagram of the cache sub-system highlighting the connections to the store queue.

FIG. 5 is a detailed diagram of the cache sub-system highlighting the connections to the store queue. Slave instruction cache 26 feeds the instruction pipeline 40 with instructions, while slave data cache 28 loads data operands into execute pipeline 50. Master cache 30 directly supplies slave instruction cache 26 with sub-lines of instructions either when a miss occurs in the slave instruction cache 26, or with a prefetching mechanism.

A bus-interface unit (BIU) includes a read buffer 10, which reads data from an external memory, such as a level-2 cache or DRAM main memory. Read buffer 10 supplies data to master cache 30 when a miss occurs in master cache 30, or a prefetching mechanism requires the data. A bus-interface-unit write buffer 12 stores data that is to be written out to the main memory, and can be several words deep. The master cache 30 can load BIU write buffer 12 when an older line is cast out of master cache 30 to make room for a new cache line.

Master cache 30 does not send fill data directly to slave data cache 28 when a miss occurs in slave data cache 28. Instead, the fill data from the master cache 30 is sent to the store queue 52, and then written into slave data cache 28. A slave data cache write buffer 14 holds one sub-line of data, along with a tag and sub-line valid bits for writing into the slave data cache 28. As an entry from store queue 52 is written into slave data cache 28, it is first transferred to write buffer 14 and then written into a location in slave data cache 28. When the store queue 52 is full, fill data may be written into write buffer 14 rather than into store queue 52. Any data in the write buffer 14 will be written to the slave data cache on the next clock cycle. The write buffer is an advantage since fill data can always be sent to the store queue or to the write buffer 14 if the store queue is full, so no flow control mechanism is needed for fill data.

If there are no more empty entries in the store queue, then the fill data is loaded into the slave write buffer, which is always empty because it is written into the slave data cache on each following cycle. If an existing store queue entry has the same sub-line address, then the fill is merged in with this existing entry.

Store data operands from execute pipeline 50 are first stored into store queue 52. From store queue 52 this store data is then written into the master cache 30 and possibly the slave data cache 28. If the store data is designated write-through, then it may also be written out to main memory via the master cache through BIU write buffer 12. Additionally, the store data may not be normal store data, but a cache operation destined for master cache 30, or a translation-lookaside buffer (TLB) entry destined for a TLB or other structure.

PIPELINE MANAGEMENT

For the preferred embodiment, the execute pipeline ends with the three pipestages: C, M, W: for Cache, Match, and Write-back. During the C stage, the tags of the slave data cache are accessed to determine if any match with the physical address of a load or a store, and the data for any such matching tag is latched. The load or store is caused by execution of an instruction in the C-stage of the execute pipeline. In the M stage, the latched tags are compared to determine if a hit or miss has occurred, while in the W stage the store is written to the store queue.

Because line fills can occur at any time, the match determination may change. A hit may be indicated in the C stage when the tags are read, but a line fill to the same cache-line index could invalidate the matching cache line, causing a hit to change to a miss (or vice-versa) in the M or W stages. Pipeline management is necessary to track the effects of multiple operations occurring simultaneously.

When a line fill occurs and a load in the C stage detects that the fill is to the same cache-line index as the load, a stall is necessary to let the fill complete. The fill could contain the line needed by the load, or the fill could invalidate the line containing the fill. Until the fill is in the store queue, the tags for that line are in an uncertain state. Loads in the C stage are also stalled if a store is occurring to the same sub-line as the load. This is the classic data dependency stall. The store occurs later in the pipeline than the load, as the store occurs in the M or W stage while the load stalls in the C stage. The store may be pending, being in the M or W stage but not yet having been written into the store queue.

As with loads, for stores, the match (hit) is first indicated in the C stage when the tags are read, but must be tracked for the M and W stages. Tracking is necessary because a fill may alter or invalidate the matching line in the cache or store queue. Tracking in the M and W stages avoids reading the tags for a second or third time.

As with loads, when a line fill occurs and a store in the C stage detects that the fill is to the same cache-line index as the store, a stall is also necessary to let the fill complete. The fill could contain the line needed by the store, or the fill could invalidate the line containing the fill. A store in the W stage may stall for one cycle if a fill for the same sub-line is in progress; this avoids the complexity of both master and execute pipeline writing the same store queue entry on the same cycle.

COMPLEX OPERATIONS

Interfering Entries with Same Cache Line or Index

As a fill is loading an entry into either the store queue or the slave write buffer, a compare will be performed to look for store queue entries that have a physical address matching the cache line index portion of the fill's address but having a different physical address. Any entries with this matching line index would be placed in the same location (line) in the slave data cache. Since lines with two different addresses (tags) cannot be placed in the same line in the cache as the slave data cache is direct-mapped, the older line in the store queue is prevented from being loaded into the slave data cache by clearing its slave valid and slave tag valid bits. If the older entry was a store, data will not be lost because it will still be written to the master cache.

If the compare reveals a store queue entry that has both the same line index, and the same tag, meaning that they are the same line, but possibly a different sub-line, then the slave tag valid bit of the older entry is cleared. This is the same procedure as for subsequent sub-lines of a line fill, that the slave tag valid bit of each previous sub-line is turned off when a new sub-line is loaded. Thus the same compare and clear logic can be used.

Finally, if the compare reveals a store queue entry that has the same line index, the same tag, and even the same sub-line, then the fill data can be merged into the entry for the older line. Any bytes that are in the store queue and valid for the master must take precedence over fill data being merged in from the master.

Flexible Order of Operations

Using this compare and update mechanism of the tag valid bits allows fills and stores to be processed in any order with respect to the slave data cache. Since the order need not be preserved, empty entries can be used without regard to their relative location. However, the order to the master cache must be preserved as this can include cache operations such as invalidates and non-cacheable stores. A first-in-first-out structure need not be used, simplifying the design and control of the store queue. Stores or fills will be written into the slave write buffer and then into the slave data cache anytime a free cycle occurs, when the slave data cache is not being used for a load or another store. The slave's write buffer can be used for pipelining the store by being located in close proximity to the slave data cache. The slave valid and slave tag valid bits in the store queue are cleared as soon as the entry is moved to the slave write buffer.

Line Fills Setting Tag Valid Bits

For a typical cache-line fill, four sub-lines are successively loaded into four store queue entries. The physical address or tag field is loaded for each entry. The slave tag valid bit and the slave valid bit are set in a special way. Special compare logic in the store queue determines if any previous entry in the store queue has the same cache-line address. If such a matching entry is found, the slave tag valid and slave valid bits for these earlier matching entries are cleared. With this procedure, only one tag will be valid for a given line in the store queue; this is the most recently written entry for the line.

Cache line fills are complex operations. Since an entire sub-line is written to each store-queue entry, all eight of the slave byte enables are set for each entry. As each cache line in the slave data cache has four sub-lines, and each store queue entry can hold just one sub-line, an entire line fill will occupy four entries in the store queue.

In the best case, the first sub-line will be loaded into the store queue on the first cycle, the second sub-line on the second clock cycle, the third on the third cycle and the fourth sub-line on the fourth clock cycle. Each of the four sub-lines corresponds to a different one of the four sub-line valid bits. The sub-line valid bits are cumulative, indicating all the other valid sub-lines that have previously been written to that line. For example, the first sub-line has its sub-line valid bits set to 0001, while the second sub-line sets the sub-line valid bits to 0011, the third to 0111, and the fourth to 1111. For the second sub-line, 0011 indicates that both the first and the second sub-lines are valid. The slave tag valid bit for the first sub-line is cleared when the second sub-line is put in the store queue, validating both first and second sub-lines. Likewise, as the fourth sub-line is being written into the store queue, its slave tag valid bit is set, and the slave tag valid bits for other store queue entries in the same line are cleared. The sub-line valid bits for the fourth sub-line, 1111, indicate that all four sub-lines are valid. The sub-line valid bits stored in the entries for the other three lines are ignored because their slave tag valid bits are cleared.

CACHE OPERATIONS LOADED INTO STORE QUEUE

An invalidation instruction that is processed by the execute pipeline can also use the store queue 52. The store queue is sent the invalidation request for the master cache. A cache management operation bit (CO) in the store queue, encoded in type field 94, is set by the CPU to indicate that the store data is actually a cache management operation. Thus the store queue may be used to send cache management operations directly to the master cache.

Types of Cache Operations

Cache operations such as invalidates, compares, and block-zeroing are provided for in some instruction sets. When the execute pipeline encounters a cache operation instruction, it places an entry into the store queue much as it would for a normal store. However, the control bits are set in a different manner to indicate that the entry in the store queue is a cache operation rather than a normal store or line fill. In particular, the non-wrapable bit (NW) is set to indicate that the entry is not normal and cannot be bypassed or wrapped to satisfy a load from the processor. Additionally, the cache operation bit (CO) is set. This CO bit will be decoded by the master cache as it consumes the store queue entry. The master valid bit is set, but the slave and slave tag valid bits are not set as the slave does not perform cache operations but can merely read and write data and tags.

The type of cache operation is encoded and loaded into the data field for the store queue entry. The master cache, upon decoding the CO bit, also decodes the data field to determine which cache operation to perform. For invalidates, the physical address field of the store queue entry will contain the sub-line address to invalidate. Merges will never occur into an entry marked as non-wrapable, and a cache operation will never be merged into any other store queue entry. If another entry in the store queue has the same address, then the cache operation will be loaded into an empty entry rather than merged. This is an exception to the rule that two entries cannot have the same address. A sync operation may have to be done after a cache operation is loaded to make sure that the store queue gets emptied out. The sync operation can be used to place a "store barrier" in the instruction stream. The store barrier ensures that all instructions before the store barrier that might affect the cache are executed first.

Diagnostic operations read or write to locations in the master or slave caches. The NW bits is set, as is one of the valid bits to indicate whether to write to the master or slave data arrays, or the slave's tags. Diagnostic writes can also be performed to the TLB.

INVALIDATION FROM MASTER TO SLAVE

All cache operations from the execute pipeline are sent to the master cache and not to the slave caches. The master cache contains valid bits for the slaves, as well as its own valid bits. When an invalidation command is sent to the master cache, the physical address from the store queue entry indicates the address to invalidate. If this address matches the physical address of a line in the master cache, then the master valid bit in the master cache is cleared. If a slave valid bit for this line in the master is also set, then it too is cleared and an invalidate is sent to the slave cache.

The invalidate sent to the slave cache appears as a line fill, which sets both the slave valid bit and the slave tag bit set, but the sub-line valid bits are cleared. If all sub-line valid bits are cleared, then the entry is an invalidate.

The slave data cache will write the new tag into the slave data cache, but will write the sub-line valid bits 70A, 70B, 70C, 70D as zero. This has the effect of invalidating the line in the slave data cache.

NON-CACHEABLE STORES

A store queue entry with its cache inhibit bit (I) set indicates that the store data should not be written to either the slave or master cache. However, the master valid bit is still set. When the master cache consumes the non-cacheable entry, it will decode the inhibit bit and not write the data into the master cache. Instead, the store data will be sent directly to the BIU write buffer so it can be written to the external memory.

If the execute pipeline requests a load from a memory location that is non-cacheable then the master cache will process all non-cacheable stores in the store buffer before processing the non-cacheable load. This preserves the ordering of these non-cacheable operations, which are often order-dependent since they can access memory-mapped I/O devices. A global signal from the store queue indicates if any entries have their non-cacheable cacheable bit set. This global signal can be a simple OR-ing of these non-cacheable bits, each AND-ed with their master valid bits. The master cache can process all non-cacheable stores by continuing to consume stores from the store queue until this signal becomes de-asserted.

ADVANTAGES OF THE SHARED STORE QUEUE

The close coupling of the master cache 30 and the slave data cache 28 allows the store queue 52 to be shared between the master cache and the slave data cache. Sharing the store queue eliminates having a second store queue for the master cache 30, or a fill buffer from the master cache to the slave data cache. Cache management requests are communicated from the execution pipeline to the master cache using the shared store queue. The store queue preserves the order of these cache management requests to the master cache. Stores may be merged together in the store queue before being written to the master or slave cache, reducing bandwidth for writes.

ALTERNATE EMBODIMENTS

Several other embodiments are contemplated by the inventors. For example the invention may easily be applied to various data-path widths and arrangements of cache structures beside those with 64-bit sub-lines and four sub-lines per line. The fields in a store queue entry may also vary somewhat, as it is possible to combine some fields together or split others apart. Other types of cache operations besides coherency, invalidation, and diagnostic operations could be routed through the store queue, and the store queue could be used for stores to structures such as translation-lookaside buffers and other storage and look-up structures.

Supplying the full 64-bit sub-line to the 32-bit execution pipeline is an advantage when the operand is mis-aligned with the 32-bit word; there is a good probability that the entire mis-aligned word can be supplied by selecting the proper bytes of the aligned sub-line. Other embodiments may have the sub-line size match the pipeline width. The slave dam cache may be set-associative rather than direct-mapped.

The foregoing description of the embodiments of the invention has been presented for the purposes of illustration and description. It is not intended to be exhaustive nor to limit the invention to the precise form disclosed. Many modifications and variations are possible in light of the above teaching. It is intended that the scope of the invention be limited not by this detailed description, but rather by the claims appended hereto.

We claim:

1. A master-slave cache system for transferring data between a main memory and a central processing unit (CPU), the CPU having an execution pipeline executing at a first rate, the main memory storing a plurality of operands, the system comprising:

a master cache for storing operands, the master cache coupled to the main memory, the master cache storing a first subset of the plurality of operands stored in the main memory, the master cache storing a second subset of operands, the second subset being a subset of the first subset;

a slave data cache, coupled to the execution pipeline, for storing the second subset of operands, the slave data cache capable of transferring operands to the execution pipeline at the first rate; and a store queue, coupled to receive stores from the execution pipeline, for temporarily storing operands for writing to the master cache and the slave data cache;

whereby the slave data cache matches the first rate required by the execution pipeline.

2. The master-slave cache system of claim 1 wherein the queue includes:

means for receiving line fills from the master cache;

means for storing the line fills in the store queue; and means for writing the line fills to the slave data cache, wherein the slave data cache does not receive the line fills directly from the master cache; the master cache writing the line fills for the slave data cache to the store queue, whereby the store queue stores operands from the execute pipeline for writing to the master cache and the slave data cache and the store queue stores line fills from the master cache to the slave data cache.

3. The master-slave cache system of claim 2 wherein the store queue receives a line fill from the master cache in response to a miss in the slave data cache.

4. The master-slave cache system of claim 2 wherein the store queue comprises a plurality of entries, each entry in the plurality of the entries comprising:

a data field for storing store data from the execute pipeline or line fill data from the master cache;

a physical address field for indicating a portion of a physical address of data in the data field;

destination valid means for indicating a destination of the data in the data field.

5. The master-slave cache system of claim 4 wherein the destination valid means comprises:

master valid indicating means for indicating if the entry contains valid data for writing to the master cache;

slave valid indicating means for indicating if the entry contains valid data for writing to the slave data cache.

6. The master-slave cache system of claim 5 wherein the destination valid means further comprises:

slave tag valid indicating means for indicating if the entry contains a valid physical address for writing to a tag in the slave data cache.

7. The master-slave cache system of claim 6 wherein each entry further comprises:

cache operation indicating means for indicating that the entry is a cache operation rather than a store or line fill.

8. The master-slave cache system of claim 7 wherein the data field includes an encoding of a type of cache operation when the cache operation indicating means indicates that the entry is a cache operation.

9. A master-slave cache system for transferring data between a main memory and a central processing unit (CPU), the CPU having an execution pipeline executing at a first rate, the main memory storing a plurality of operands, the system comprising:

a master cache for storing operands, the master cache coupled to the main memory, the master cache storing a first subset of the plurality of operands stored in the main memory, the master cache storing a second subset of operands, the second subset being a subset of the first subset;

a slave data cache, coupled to the execution pipeline, for storing the second subset of operands, the slave data cache capable of transferring operands to the execution pipeline at the first rate; and a store queue, coupled to receive stores from the execution pipeline, for temporarily storing operands for writing to the master cache and the slave data cache, the store queue comprising:

means for receiving line fills from the master cache;

means for storing the line fills in the store queue;

means for writing the line fills to the slave data cache; and a plurality of entries, each entry in the plurality of the entries comprising:

a data field for storing store data from the execute pipeline or line fill data from the master cache;

a physical address field for indicating a portion of a physical address of data in the data field;

cache operation indicating means for indicating that the entry is a cache operation rather than a store or line fill;

destination valid means for indicating a destination of the data in the data field, the destination valid means including:

master valid indicating means for indicating when the entry contains valid data for writing to the master cache;

slave valid indicating means for indicating when the entry contains valid data for writing to the slave data cache; and slave tag valid indicating means for indicating when the entry contains a valid physical address for writing to a tag in the slave data cache;

wherein the master valid indicating means indicates that the entry contains valid data for writing to the master cache and the slave valid indicating means indicates that the entry is not for writing to the slave data cache when the cache operation indicating means indicates that the entry is a cache operation, whereby cache operations are only sent to the master cache but not to the slave data cache, whereby the store queue stores operands from the execute pipeline for writing to the master cache and the slave data cache and the store queue stores line fills from the master cache to the slave data cache.

10. The master-slave cache system of claim 9 wherein the destination valid indicating means further comprises sub-line validity means for indicating valid sub-lines in a cache line, and wherein the master cache invalidates an entry in the slave data cache by writing a slave invalidation entry into the store queue, the slave invalidation entry having (a) the cache operation indicating means indicate that the entry is not a cache operation;
(b) the master valid indicating means indicate that the entry is not for writing to the master cache;
(c) the slave tag valid indicating means indicate that the entry contains a valid physical address for writing to the tag in the slave data cache;
(d) the sub-line validity means indicate that no sub-lines in the cache line are valid, whereby the tag in the slave data cache is written with a valid bit indicating that a corresponding entry in the slave data cache is not valid.

11. A master-slave cache system for transferring data between a main memory and a central processing unit (CPU), the CPU having an instruction pipeline decoding instructions at a first rate, the CPU having an execution pipeline executing at a second rate, the main memory storing a plurality of operands and a plurality of instructions, the system comprising:

a master cache for storing operands and instructions, the master cache coupled to the main memory, the master cache storing a first subset of the plurality of operands and a second subset of the plurality of instructions stored in the main memory, the master cache storing a third subset of instructions and a fourth subset of operands, the third subset being a subset of the second subset, and the fourth subset being a subset of the first subset;

a slave instruction cache, coupled to the master cache and coupled to the instruction pipeline, for storing the third subset of instructions, the slave instruction cache capable of transferring instructions to the instruction pipeline at the first rate;

a slave data cache, coupled to the execution pipeline, for storing the fourth subset of operands, the slave data cache capable of transferring operands to the execution pipeline at the second rate;

a store queue, coupled to receive stores from the execution pipeline, for temporarily storing operands for writing to the master cache and the slave data cache;

a plurality of master tags, stored in the master cache, each master tag in the plurality of master tags comprising:

an address tag field, for storing a tag portion of an address of a data item, the data item being one of the plurality of operands or one of the plurality of instructions stored in main memory;

master valid indicating means for indicating that the data item is valid and present in the master cache;

slave-instruction valid indicating means for indicating that the data item is valid and present in the slave instruction cache; and slave-data valid indicating means for indicating that the data item is valid and present in the slave data cache, whereby the slave instruction cache matches the first rate required by the instruction pipeline, and the slave data cache matches the second rate required by the execution pipeline and whereby the master cache contains information on valid words present in the slave instruction cache and the slave data cache.

12. The system of claim 11 wherein the store queue further comprises:

means for receiving store data and an address of the store data from the execution pipeline;

means for writing store data to the master cache when the master cache is not busy;

means for writing store data to the slave data cache if the address of the store data is present in the slave data cache and the slave data cache is not busy; and means for storing a plurality of store data and a plurality of addresses of the store data, whereby the store queue is shared between the master cache and the slave data cache, the store queue receiving store data from the execution pipeline and writing the store data when the master cache and the slave data cache are each not busy.

13. The system of claim 12 wherein the execution pipeline uses the store queue to write store data to the slave data cache and to the master cache, eliminating a need for the slave data cache to write through to the master cache.

14. The system of claim 13 wherein invalidation and cache management operations from the CPU are placed in the store queue and written only to the master cache and not to the slave data cache, the master cache performing invalidation and cache management operations for the slave data cache.

15. The system of claim 11 wherein the store queue further comprises:

means for receiving line-fill data from the master cache;

means for writing the line-fill data to the slave data cache when the slave data cache is not busy;

whereby the store queue is also a line-fill buffer between the master cache and the slave data cache, the store queue receiving line-fill data from the master cache and writing the line-fill data when the slave data cache is not busy.

16. The system of claim 15 wherein the store queue receives the line-fill data from the master cache when data requested by the execution pipeline is not present in the slave data cache, wherein the line-fill data is sent to the slave data cache when the slave data cache misses.

17. The system of claim 15 wherein the line-fill data from the master cache comprises less than an entire cache line in the slave data cache, wherein the line-fill data is a sub-line of data.

18. A master-slave cache system for transferring data between a main memory and a central processing unit (CPU), the CPU having an execution pipeline, the main memory storing a plurality of operands, the system comprising:

a master cache for storing operands, the master cache coupled to the main memory, the master cache storing a plurality of operands stored in the main memory;

a slave data cache, coupled to the execution pipeline, for storing operands, the slave data cache capable of transferring operands to the execution pipeline; and a store queue, coupled to receive stores from the execution pipeline, for temporarily storing operands for writing to the master cache and the slave data cache, the store queue comprising:

means for receiving line fills from the master cache;
means for storing the line fills in the store queue;
means for writing the line fills to the slave data cache; and a plurality of entries, each entry in the plurality of the entries comprising:

a data field for storing store data from the execute pipeline or line fill data from the master cache;

a physical address field for indicating a portion of a physical address of data in the data field;

cache operation indicating means for indicating that the entry is a cache operation rather than a store or line fill;

destination valid means for indicating a destination of the data in the data field, the destination valid means including:

> master valid indicating means for indicating when the entry contains valid data for writing to the master cache;
>
> slave valid indicating means for indicating when the entry contains valid data for writing to the slave data cache; and
>
> slave tag valid indicating means for indicating when the entry contains a valid physical address for writing to a tag in the slave data cache;

wherein the master valid indicating means indicates that the entry contains valid data for writing to the master cache and the slave valid indicating means indicates that the entry is not for writing to the slave data cache when the cache operation indicating means indicates that the entry is a cache operation, whereby cache operations are only sent to the master cache but not to the slave data cache, whereby the store queue stores operands from the execute pipeline for writing to the master cache and the slave data cache and the store queue stores line fills from the master cache to the slave data cache.

19. The master-slave cache system of claim 18 wherein the destination valid indicating means further comprises sub-line validity means for indicating valid sub-lines in a cache line, and wherein the master cache invalidates an entry in the slave data cache by writing a slave invalidation entry into the store queue, the slave invalidation entry having (a) the cache operation indicating means indicate that the entry is not a cache operation;

(b) the master valid indicating means indicate that the entry is not for writing to the master cache;

(c) the slave tag valid indicating means indicate that the entry contains a valid physical address for writing to the tag in the slave data cache;

(d) the sub-line validity means indicate that no sub-lines in the cache line are valid, whereby the tag in the slave data cache is written with a valid bit indicating that a corresponding entry in the slave data cache is not valid.

* * * * *